(12) United States Patent
Pan et al.

(10) Patent No.: US 12,493,927 B2
(45) Date of Patent: Dec. 9, 2025

(54) ROBUST AND EFFICIENT BLIND SUPER-RESOLUTION USING VARIATIONAL KERNEL AUTOENCODER

(71) Applicants: Baidu USA, LLC, Sunnyvale, CA (US); Baidu.com Times Technology (Beijing) Co., Ltd., Beijing (CN)

(72) Inventors: Zhihong Pan, San Jose, CA (US); Baopu Li, Santa Clara, CA (US); Dongliang He, Beijing (CN); Wenhao Wu, Beijing (CN); Tianwei Lin, Shanghai (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 152 days.

(21) Appl. No.: 18/556,653

(22) PCT Filed: Sep. 30, 2021

(86) PCT No.: PCT/CN2021/122050
§ 371 (c)(1),
(2) Date: Oct. 20, 2023

(87) PCT Pub. No.: WO2023/050258
PCT Pub. Date: Apr. 6, 2023

(65) Prior Publication Data
US 2024/0185386 A1    Jun. 6, 2024

(51) Int. Cl.
*G06T 3/4076* (2024.01)
*G06N 3/0455* (2023.01)
*G06T 3/4046* (2024.01)

(52) U.S. Cl.
CPC ......... *G06T 3/4076* (2013.01); *G06N 3/0455* (2023.01); *G06T 3/4046* (2013.01)

(58) Field of Classification Search
CPC ... G06T 3/4053; G06T 3/4076; G06T 3/4046; G06T 2207/20081; G06T 2207/20084;
(Continued)

(56) References Cited

U.S. PATENT DOCUMENTS

2018/0068430 A1    3/2018 Sang et al.
2021/0049739 A1*   2/2021 Schroers .............. G06T 3/4046
(Continued)

FOREIGN PATENT DOCUMENTS

| CN | 106530256 A | 3/2017 | |
| CN | 109767389 A | 5/2019 | |
| WO | WO-2022174930 A1 * | 8/2022 | ........... G06T 3/4053 |

OTHER PUBLICATIONS

Luo, Zengxiong, et al. "Unfolding the alternating optimization for blind super resolution." Advances in Neural Information Processing Systems 33 (2020): 5632-5643. (Year: 2020).*

(Continued)

*Primary Examiner* — Geoffrey E Summers
(74) *Attorney, Agent, or Firm* — Oppedahl Patent Law Firm LLC

(57) ABSTRACT

Image super-resolution (SR) refers to the process of recovering high-resolution (HR) images from low-resolution (LR) inputs. Blind image SR is a more challenging task which involves unknown blurring kernels and characterizes the degradation process from HR to LR. In the present disclosure, embodiments of a variational autoencoder (VAE) are leveraged to train a kernel autoencoder for more accurate degradation representation and more efficient kernel estimation. In one or more embodiments, a kernel-agnostic loss is used to learn more robust kernel features in the latent space from LR inputs without using ground-truth kernel references. In addition, attention-based adaptive pooling is introduced to improve kernel estimation accuracy, and spatially non-uniform kernel features are passed into SR restoration (Continued)

resulting in additional kernel estimation error tolerance. Extensive experiments on synthetic and real-world images show that embodiments of the presented model outperform state-of-the-art methods significantly with the peak signal-to-noise ratio (PSNR) raised considerably.

20 Claims, 13 Drawing Sheets

(58) Field of Classification Search
CPC .... G06T 5/70; G06T 5/73; G06T 5/75; G06T 5/60; G06T 5/00; G06N 3/02–0985; G06N 3/045; G06N 3/0455
See application file for complete search history.

(56) References Cited

U.S. PATENT DOCUMENTS

| | | |
|---|---|---|
| 2021/0166350 A1 | 6/2021 | Wang et al. |
| 2022/0122223 A1* | 4/2022 | Choi .................. G06T 5/70 |

OTHER PUBLICATIONS

Bell-Kligler et al.,"Blind Super-Resolution Kernel Estimation using an Internal-GAN," Advances in Neural Information Processing Systems, 2019. (10 pgs) (Year: 2019).*
Gu et al.,"Blind super-resolution with iterative kernel correction," arXiv preprint arXiv:1904.03377, 2019. (10pgs) (Year: 2019).*
Heydari, A. Ali, and Asif Mehmood. "SRVAE: super resolution using variational autoencoders." Pattern Recognition and Tracking XXXI. vol. 11400. SPIE, 2020. (Year: 2020).*
Liu, Zhi-Song, Wan-Chi Siu, and Yui-Lam Chan. "Photo-realistic image super-resolution via variational autoencoders." IEEE Transactions on Circuits and Systems for video Technology 31.4 (2020): 1351-1365. (Year: 2020).*
Zhu, Mingyan, et al. "Edke: Encoder-decoder based kernel estimation for blind image super-resolution." 2021 International Joint Conference on Neural Networks (IJCNN). IEEE, 2021. (Year: 2021).*
Zhou, Ruofan, and Sabine Susstrunk. "Kernel Modeling Super-Resolution on Real Low-Resolution Images." 2019 IEEE/CVF International Conference on Computer Vision (ICCV). IEEE, 2019. (Year: 2019).*
Agustsson et al.,"NTIRE 2017 Challenge on Single Image Super-Resolution: Dataset & Study," Proc. of the IEEE Conf on Computer Vision & Pattern Recognition Workshops,2017.(10p).
Bell-Kligler et al.,"Blind Super-Resolution Kernel Estimation using an Internal-GAN," Advances in Neural Information Processing Systems, 2019. (10 pgs).
Bevilacqua et al.,"Low-complexity single-image super-resolution based on nonnegative neighbor embedding," In Proc. of the British Machine Vision Conference, 2012. (10pgs).
Chen et al.,"Variational lossy autoencoder," arXiv preprint arXiv:1611. 02731, 2017. (17pgs).
Dai et al.,"Is Image Super-resolution Helpful for Other Vision Tasks?," arXiv preprint arXiv:1509.07009, 2016. (9pgs).
Dong et al.,"Learning a deep convolutional network for image super-resolution," In European conference on computer vision, Springer, 2014. (16pgs).
Gu et al.,"Blind super-resolution with iterative kernel correction," arXiv preprint arXiv:1904.03377, 2019. (10pgs).
Gulrajani et al.,"Pixel-VAE: A latent variable model for natural images," arXiv preprint arXiv:1611.05013, 2016. (9pgs).
Haris et al.,"Task-Driven Super Resolution: Object Detection in Low-resolution Images," arXiv preprint arXiv:1803.11316, 2018. (26pgs).

Huang et al.,"Single Image Super-resolution from Transformed Self-Exemplars," In: Proc. of the IEEE conference on computer vision & pattern recognition, 2015. (10pgs).
Martin et al.,"A database of human segmented natural images and its application to evaluating segmentation algorithms and measuring ecological statistics,".
In Proceedings Eighth IEEE International Conference on Computer Vision, ICCV 2001, 2001. (8 pgs).
Michaeli et al.,"Nonparametric blind super-resolution," In Proceedings of the IEEE International Conference on Computer Vision, 2013. (8pgs).
Shocher et al.,"Zero-Shot Super-Resolution using Deep Internal Learning," arXiv preprint arXiv:1712.06087, 2017. (9pgs).
Timofte et al.,"NTIRE 2017 challenge on single image super-resolution: Methods and results,".
In Proceedings of the IEEE conference on computer vision & pattern recognition workshops, 2017. (12pgs).
Ulyanov et al.,"Deep Image Prior," In Proceedings of the IEEE conference on computer vision & pattern recognition, 2018. (9pgs).
Wang et al.,"Unsupervised degradation representation learning for blind super-resolution," arXiv preprint arXiv:2104.00416, 2021. (10pgs).
Yan et al.,"Attribute2Image: Conditional image generation from visual attributes," arXiv preprint arXiv:1512.00570, 2016. (19pgs).
Zeyde et al.,"On Single Image Scale-Up using Sparse-Representation," International conference on curves and surfaces, Springer, 2010. (20pgs).
Kim et al.,"Deeply-Recursive Convolutional Network for Image Super-Resolution," arXiv preprint arXiv:1511.04491, 2016. (9pgs).
Kim et al.,"KOALAnet: Blind super-resolution using kernel-oriented adaptive local adjustment," arXiv preprint arXiv:2012. 08103, 2020. (17pgs).
Kingma et al.,"ADAM: A Method for Stochastic Optimization," arXiv preprint arXiv:1412.6980, 2017. (15pgs).
Kingma et al.,"Auto-encoding variational bayes," arXiv preprint arXiv:1312.6114, 2014. (14pgs).
Lai et al.,"Deep Laplacian Pyramid Networks for Fast and Accurate Super-Resolution," arXiv preprint arXiv:1704.03915, 2017. (9pgs).
Ledig et al.,"Photo-realistic single image super-resolution using a generative adversarial network,".
In Proceedings of the IEEE conference on computer vision and pattern recognition, 2017. (10pgs).
Liang et al.,"Flow-based kernel prior with application to blind super-resolution," arXiv preprint arXiv:2103.15977, 2021. (10pgs).
Lim et al.,"Enhanced deep residual networks for single image super-resolution," arXiv preprint arXiv:1707.02921, 2017. (9pgs).
Luo et al.,"Unfolding the alternating optimization for blind super resolution," arXiv preprint arXiv: 2010.02631, 2020. (12pgs).
International Search Report dated Jun. 27, 2022, in the International Patent Application No. PCT/CN2021/122050. (5 pgs).
International Written Opinion dated Jun. 27, 2022 , in the International Patent Application No. PCT/CN2021/122050. (4pgs).
Zhang et al.,"Deep unfolding network for image super-resolution," In Proceedings of the IEEE Conference on Computer Vision & Pattern Recognition, 2020. (10pgs).
Zhang et al.,"Learning a single convolutional super-resolution network for multiple degradations,".
In Proceedings of the IEEE Conference on Computer Vision & Pattern Recognition, 2018. (10pgs).
Zhang et al.,"Deep plug-and-play super-resolution for arbitrary blur kernels," In Proceedings of the IEEE Conference on Computer Vision & Pattern Recognition, 2019. (11pgs).
Zhang et al.,"Image super-resolution using very deep residual channel attention networks," In Proceedis of the European Conference on Computer Vision (ECCV), 2018. (16pgs).
Zhang et al.,"Residual Dense Network for Image Super-Resolution," In Proceedings of the IEEE Conference on Computer Vision & Pattern Recognition, 2018. (10pgs).

* cited by examiner

_300_

| For a training set comprising multiple HR-LR image pairs, wherein in each pair the LR image is degraded from its corresponding HR image using a GT kernel, outputting, via an iterative restoration-estimation process, a recovered image using the Restorer and an estimated kernel feature vector using the Estimator from an HR-LR image pair | — 305 |

| Obtaining a restoration loss based on the recovered image and the HR image | — 310 |

| Obtaining a kernel feature loss based on the estimated kernel feature vector and the kernel feature vector that is encoded, by the kernel encoder, from the GT kernel | — 315 |

| Training the blind SR model using at least the restoration loss and the kernel feature loss | — 320 |

605 — For a training set comprising multiple LR image pairs wherein in each pair has an original LR image and a transformed LR image transformed from the original LR image via a 2D transformation, outputting, using the blind SR model, a first estimated kernel feature vector for the original LR image and a second estimated kernel feature vector for the transformed LR image in each LR image pair 610 — Decoding, using the kernel decoder, the first estimated kernel feature vector and the second estimated kernel feature vector into a first estimated kernel and a second estimated kernel respectively 615 — Obtaining an inversely transformed kernel by applying an inverse transformation of the 2D transformation to the second estimated kernel 620 — Obtaining a similarity between the first estimated kernel and the inversely transformed kernel 625 — Constructing a kernel-agnostic loss that comprises the similarity 630 — Training the blind SR model using at least the kernel-agnostic loss

FIG. 6

ROBUST AND EFFICIENT BLIND SUPER-RESOLUTION USING VARIATIONAL KERNEL AUTOENCODER

CROSS-REFERENCE TO RELATED APPLICATIONS

This patent application is filed pursuant to 35 USC § 371 as a US National Phase Application of International Patent Application No. PCT/CN2021/122050, filed on 30 Sep. 2021, entitled "ROBUST AND EFFICIENT BLIND SUPER-RESOLUTION USING VARIATIONAL KERNEL AUTOENCODER," listing Zhihong Pan, Baopu Li, Dongliang He, Wenhao Wu, and Tianwei Lin as inventors, which patent document is incorporated by reference herein in its entirety and for all purposes.

TECHNICAL FIELD

The present disclosure relates generally to systems and methods for computer learning that can provide improved computer performance, features, and uses. More particularly, the present disclosure relates to systems and methods for robust and efficient blind super-resolution.

BACKGROUND

Deep neural networks have achieved great successes in many domains, such as computer vision, natural language processing, recommender systems, etc.

Image super-resolution (SR) refers to the process to recover high-resolution (HR) images from low-resolution (LR) inputs. It is an important image processing technique to enhance image quality which subsequently helps to improve high-level computer vision tasks. Recent models for blind image SR generally combine both kernel estimation and image restoration modules into an end-to-end training framework, where the estimated kernel or kernel features are fused with LR inputs and features for SR restoration. Although they are less sensitive to kernel estimation uncertainties, they may still not be robust to great variations in kernels and kernel estimation errors and the performance may drop significantly in real-world LR images.

Accordingly, what is needed are systems and methods for robust and efficient blind super-resolution.

SUMMARY

In a first aspect, a computer-implemented method for blind super-resolution (SR) is provided. The method includes: in a first iteration of an iterative restoration-estimation process: receiving, at a super-resolution (SR) restorer in a blind SR model, an input image and an initial kernel feature vector to generate an intermediate recovered image, and generating, using a kernel estimator in the blind SR model, an updated kernel feature vector based on the intermediate recovered image and the LR image, where the blind SR model is trained, before deployment, using a variational kernel autoencoder (VKAE) with a training set including multiple image pairs, each image pair has a high-resolution (HR) image and a low-resolution (LR) image degraded from the HR image using a ground-truth (GT) kernel; continuing the restoration-estimation process for a plurality of iterations until a stop condition is met; and outputting a recovered image with a resolution higher than the input image by the SR restorer and a kernel feature vector by the kernel estimator.

In a second aspect, a computer-implemented method for blind super-resolution (SR) training is provided. The method includes: given a training set including multiple image pairs with each image pair having an original image and a transformed image transformed from the original image via a 2D transformation, outputting, using a blind SR model including a SR Restorer and a kernel Estimator linked iteratively, a first estimated kernel feature vector for the original image and a second estimated kernel feature vector for the transformed image in each image pair; decoding, using a kernel decoder in a variational kernel autoencoder (VKAE), the first estimated kernel feature vector and the second estimated kernel feature vector into a first estimated kernel and a second estimated kernel respectively, where the VKAE includes the kernel decoder and a kernel encoder that encodes a kernel into a kernel feature vector; obtaining an inversely transformed kernel by applying an inverse transformation of the 2D transformation to the second estimated kernel; obtaining a similarity between the first estimated kernel and the inversely transformed kernel; constructing a kernel-agnostic loss that includes the similarity; and training the blind SR model using at least the kernel-agnostic loss.

In a third aspect, a non-transitory computer-readable medium or media including one or more sequences of instructions is provided. The instructions, when executed by at least one processor, causes steps for blind super-resolution including: pre-training a variational kernel autoencoder (VKAE) using a kernel dataset including various blurring kernels, where the VKAE includes a kernel encoder to encode a blurring kernel from the kernel dataset into a kernel feature vector and a kernel decoder to reconstruct the kernel feature vector into a reconstructed burring kernel, a kernel loss between the burring kernel and the reconstructed burring kernel is used for pre-training; and training, with the pre-trained VKAE, a blind SR model using a training set including multiple image pairs, where each image pair has a high-resolution (HR) image and a low-resolution (LR) image degraded from the HR image using a ground-truth (GT) kernel, the blind SR model includes a SR Restorer and a kernel Estimator linked iteratively, the blind SR model is trained using steps including: outputting a recovered image by the SR Restorer and an estimated kernel feature vector by the kernel Estimator based on the LR image in each image pair; obtaining a restoration loss based on the recovered image and the HR image in each image pair; obtaining a kernel feature loss based on the estimated kernel feature vector and the kernel feature vector that is encoded, by the kernel encoder, from the GT kernel; and training the blind SR model using at least the restoration loss and the kernel feature loss.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts an overall structure of a main framework for blind super-resolution for both training and inference, according to embodiments of the present disclosure.

FIG. 3 depicts a training process for a blind SR model using a variational kernel autoencoder (VKAE), according to embodiments of the present disclosure.

FIG. 6 depicts a process for model training using VKAE with kernel-agnostic loss, according to embodiments of the present disclosure.

DETAILED DESCRIPTION OF EMBODIMENTS

Figure 1:
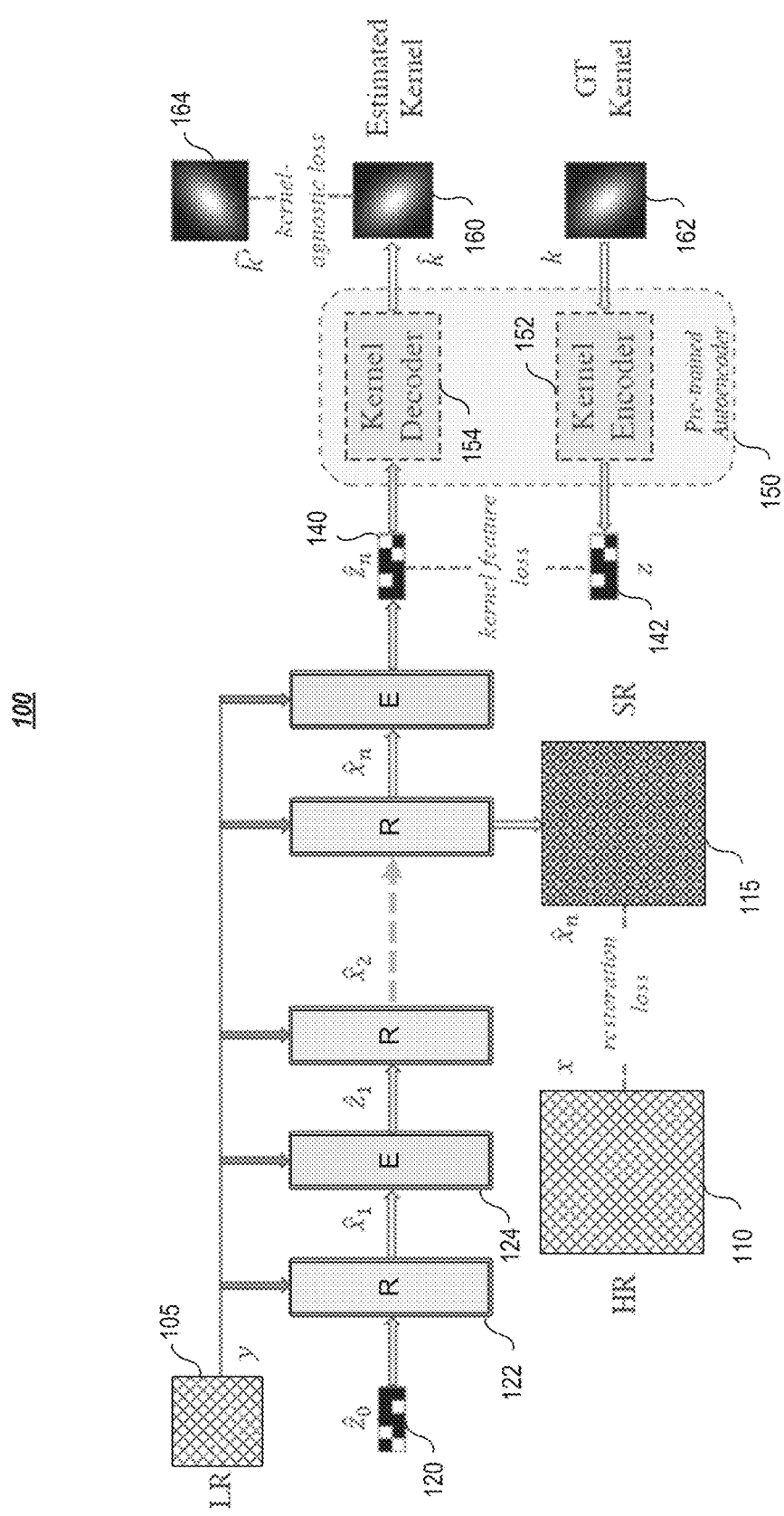

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of blind image super-resolution, aspects of the present disclosure are not so limited. Accordingly, aspects of the present disclosure may be applied or adapted for use in other contexts.

A. General Introduction

Image super-resolution (SR) refers to the process to recover high-resolution (HR) images from low-resolution (LR) inputs. It is an important image processing technique to enhance image quality which subsequently helps to improve high-level computer vision tasks. Mathematically, the degradation process may be expressed as:

$$y=(x \otimes k)\downarrow_s \quad (1)$$

where x is the ground-truth (GT) HR image, y is the degraded LR image, and k is the blur kernel. The LR degradation process applies a two-dimensional convolution $\otimes$ first before resampling ($\downarrow_s$ where s is the scaling factor) to only keep a single pixel for each distinct s×s patch. The SR process aims to recover x from y using a Restorer $\mathbb{R}$ as follows:

$$\hat{x}=\mathbb{R}(y) \quad (2)$$

Recently, various deep learning techniques have led to developments of many deep learning based SR models with remarkable results. These deep learning models rely on a large set of synthetic training HR-LR image pairs, where in each pair, the LR image is degraded from the HR image using a fixed and ideal blur kernel k* (usually a Bicubic downscaling kernel with antialiasing using MATLAB's default imresize command). Although they work very well on benchmark dataset with the same blur kernel k* as in training, their performances may drop significantly in real-world LR images because the blur kernel deviates from this ideal situation.

To solve this challenge, various methods have been proposed to train SR models which are applicable to multiple blur kernels where the ground truth (GT) blur kernel is used as an input of the model. However, in blind SR problem where the GT blur kernel is unknown, an additional step may be needed to estimate the blur kernel from given LR image. This two-step process adds a separate Estimator $\mathbb{E}$ before the Restorer $\mathbb{R}$ in Equation 2:

$$\hat{x}=\mathbb{R}(y,\hat{k})=\mathbb{R}(y, \mathbb{E}(y)) \quad (3)$$

This two-step process is often time-consuming and the estimation error in $\mathbb{E}$ could accumulate and lead to significant performance drop in $\mathbb{R}$. To solve this efficiency and accuracy challenge, more recent models try to train both Estimator $\mathbb{E}$ and the Restorer $\mathbb{R}$ in the following iterative process:

$$\hat{x}_i=\mathbb{R}(y,\hat{k}_{i-1})$$

$$\hat{k}_i=\mathbb{E}(y,\hat{x}_i) \quad (4)$$

In some previous models, kernel features using principal component analysis (PCA) transformation is used in place of kernel k itself. While the PCA transformation helps reduce kernel feature dimensionality and remove unnecessary kernel variations from the Restorer training, this linear transformation may not be optimal in representation of kernel features. In the present patent document, inspired by works using variational autoencoder (VAE) that projects inputs into a normal distribution of features in latent space, embodiments of a variational kernel autoencoder (VKAE) are disclosed in the present patent document. The VKAE may be pre-trained to optimize a kernel encoder F that reduces dimensionality and a kernel decoder G that reconstructs the blur kernel from compressed kernel features. The kernel encoder may be used to guide the kernel Estimator to learn a more effective degradation representation efficiently. With the kernel decoder, embodiments of a novel kernel-agnostic loss are presented to help the kernel Estimator to learn more robust degradation representations. In addition, embodiments of an attention-based adaptive pooling are further presented with attention to the spatial non-uniformity of the kernel features in the latent space. Comprehensive experiments on some typical benchmark datasets validate the new state-of-the-art (SOTA) of the disclosed scheme.

Contributions of the present patent disclosure include at least the following: (1) VAE is innovatively leveraged to learn kernel features in latent space which greatly improves the learning efficacy and efficiency of the kernel Estimator in iterative blind SR models; (2) Embodiments of a novel kernel-agnostic loss are disclosed to help the kernel Estimator learn robust kernel features from LR inputs without using GT kernel references; and (3) To overcome the spatial non-uniformity of estimated kernel features, embodiments of an attention-based adaptive pooling are disclosed to improve accuracy of the kernel Estimator, and hybrid kernel features that mix the spatially-invariant global features and the spatially-variant local features may be used to increase the kernel error tolerance of the SR Restorer.

B. Some Related Work

1. Blind Super-Resolution

To address the challenge of random unknown blur kernel in blind SR problems, one kind of model focuses on estimating the real blur kernel from given LR and combines it with existing non-blind SR models which take both an LR image and its corresponding blur kernel as inputs for SR restoration. Recently, the internal patch recurrence property in images is utilized to estimate the blur kernel using a kernel generator (KernelGAN). An additional SR restoration step is applied using the ZSSR ("Zero-Shot" Super-Resolution using Deep Internal Learning) model with the generated kernel. No additional HR-LR pairs are needed for training in both steps. More recently, a normalizing flow-based kernel prior (FKP) is used to model blur kernels with greater success. It is shown to be able to either estimate the blur kernel using an LR discriminator like in KernelGAN or estimate both the SR image and blur kernel combining FKP and Deep Image Prior (DIP). Most recently, some use a non-blind SR model, deep Unfolding Super-Resolution Network (USRNet), to generate the final SR using estimated kernel from FKP. These two-step processes are time consuming as both the kernel estimation and SR restoration processes are iterative.

Another line of models tries to solve the blind SR problem as a one-step process by embedding the kernel or kernel-feature estimation module either explicitly or implicitly. A kernel estimator is trained to generate blur kernel used for initial SR restoration. The intermediate SR result is further fed into a correction network to iteratively correct the estimated kernel. Some replace the initial kernel estimator and subsequent correction module with one estimator which makes the whole network trainable in an end-to-end fashion. Both models use iterative kernel estimation from LR and intermediate SR, and use PCA transformed kernel features in place of the full kernel. Others use a degradation encoder to embed kernel features in latent space without explicit kernel representation. Yet others use a downsampling network to predict spatially-variant kernels, which are fed into kernel-oriented adaptive local adjustment (KOALA) modules to modulate the features in the upsampling network, which generates an SR result with spatially-variant upsampling kernels.

2. SR Blur Kernels

While the bicubic interpolation is most commonly used for standard non-blind SR models, there is no universal representation for blur kernels for blind SR methods. First, while some models deal with isotropic Gaussian kernels only and some work with anisotropic Gaussian only, many others work for both isotropic and anisotropic kernels but are trained and evaluated separately. Another key difference lies in the definition of blur kernel in regards to the full resize process. In some recent work, as shown in Equation 1, the SR blur kernel is the only convolutional kernel applied in the full process. Alternatively, many models apply the SR blur kernel on HR images before resizing using additional bicubic interpolation. In another recent work, the model is trained with synthesized data from the second definition while only tested using the DIV2K random kernel (DIV2KRK) dataset which is generated using the first option. Although these two options may generate LR images that are equivalent, the latter case is less inclusive since it has a minimum kernel width as contributed by bicubic interpolation. In the case of DIV2KRK, random multiplicative noise is also applied on top of anisotropic Gaussian kernels before normalized back to the sum of 1.

3. Variational Autoencoder

Autoencoder (AE) is an unsupervised artificial neural network that compresses the data to lower dimension and then reconstructs the input back. It's based on an encoder-decoder architecture, where the encoder encodes the high-dimensional data to lower-dimension and the decoder takes the lower-dimensional data and tries to reconstruct the original high-dimensional data. Comparing to PCA, while maintaining the ability to find the representation of important data features data by removing noise and redundancies, AE is a more sophisticated and complex technique that can model relatively complex relationships and non-linearities. As the autoencoder is trained with reconstruction loss from the decoder output only, the latent space where the encoded vectors lie, may not be continuous. In other words, the distance or error in latent space is not necessarily translated to error in outputs. There could be gaps in latent space due to sparse distribution of features, where feature samples from these gaps would lead to meaningless reconstruction by the decoder. This sparse distribution is not optimal to guide the learning of one or more embodiments of the kernel Estimator. Variational autoencoder (VAE) converts the input dataset to a standard normal distribution in latent space which is dense and continuous. It has been extensively applied in various computer vision models, especially generative networks. However, it appears that VAE has never been used to model blur kernel in SR models.

C. Embodiments of Blind Super-Resolution Using VKAE

1. Embodiments of Blind SR Model

FIG. 1 depicts an overall structure of a main framework for a blind SR model, according to embodiments of the present disclosure. The blind SR model comprises a kernel Estimator 124 and a SR Restorer 122 linked iteratively. Such a link improves the accuracy of the Estimator by utilizing intermediate SR results in addition to the LR input. Consequently, the Restorer may generate better SR results using increasingly accurate kernel estimations as injected features.

Figure 2:
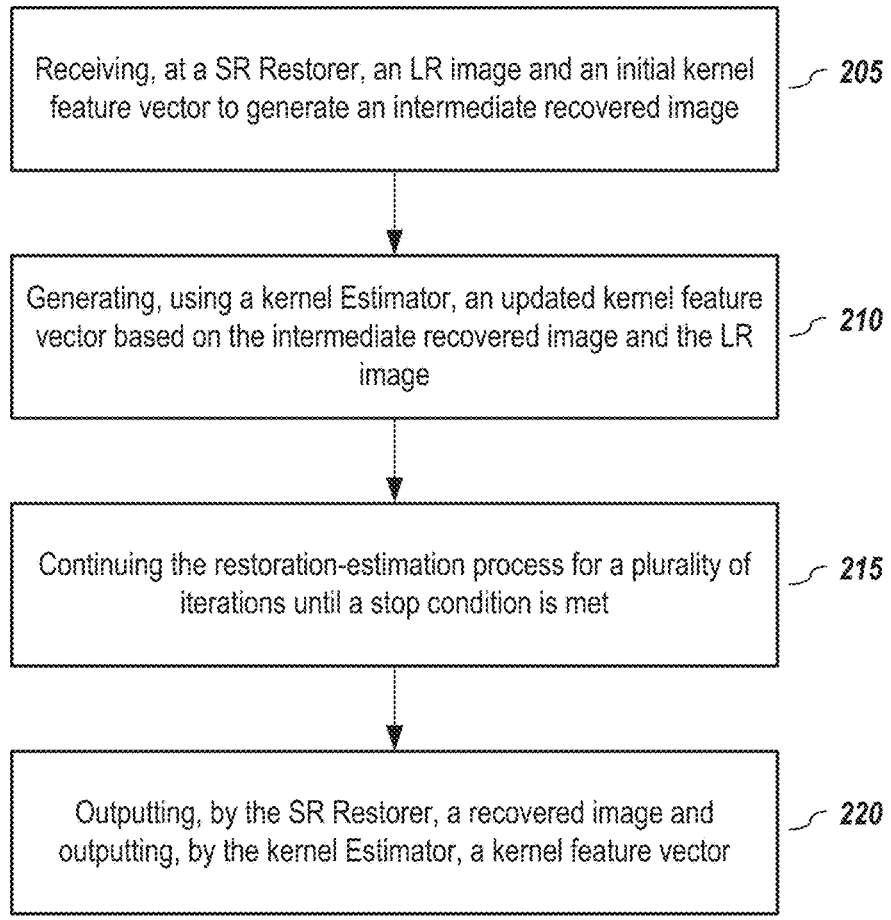
FIG. 2 depicts a process for blind super-resolution with the main framework, according to embodiments of the present disclosure.

FIG. 2 depicts a process for blind super-resolution with the main framework, according to embodiments of the present disclosure. In a first iteration of restoration-estimation operation, the SR Restorer 122 receives an input image (e.g., an LR image) y 105 and an initial kernel feature vector $\hat{z}_0$ 120 to generate (205) an intermediate recovered image $\hat{x}_1$. In one or more embodiments, the initial kernel feature vector $\hat{z}_0$ may be a default kernel feature vector corresponding to a common kernel (e.g., a bicubic kernel) or an average of kernel features in a latent space. Afterwards, the kernel Estimator 124 generates (210) an updated kernel feature vector $\hat{z}_1$ based on the intermediate recovered image $\hat{x}_1$ and the LR image y. The restoration-estimation operation continues (215) for a plurality of iterations, until a stop condition is met. In one or more embodiments, the stop condition may be a predetermined number of iterations, a recovered image or a kernel feature vector difference between iterations being less than a threshold, etc. At the last iteration, the SR Restorer 122 outputs (220) a recovered image $\hat{x}_n$ with a resolution higher than the input image y and the kernel Estimator 124 outputs a kernel feature vector $\hat{z}n$.

Referring back to FIG. 1, one of the innovative aspects of the presented patent disclosure is the use of a variational kernel autoencoder (VKAE) to train the blind SR model. The VKAE 150 comprises a kernel encoder $\mathbb{F}$ 152 and a kernel decoder $\mathbb{G}$ 154. The VKAE itself may be pre-trained using VAE with a synthesized kernel dataset.

In one or more embodiments, the full iterative process for SR model training may be described as:

$$z = \mathbb{F}(k)$$

$$\hat{x}_i = \mathbb{R}(y, \hat{z}_{i-1}), \hat{z}_i = \mathbb{E}(y, \hat{x}_i) i = 1, \ldots n$$

$$\hat{k} = \mathbb{G}(y, \hat{z}_n) \quad (5)$$

where z is the kernel feature vector 142 encoded, by the kernel encoder 152, from the GT kernel k 162, $\hat{x}_i$ is the intermediate SR from the Restorer at the ith iteration, $\hat{z}_i$ is the intermediate kernel feature vector by the Estimator at the ith iteration, and $\hat{k}$ is the estimated kernel 160 decoded from the estimated kernel feature vector $\hat{z}_n$ 140 by the kernel decoder $\mathbb{G}$. The main restoration loss $L_{rst}$ may be calculated as the L1 loss between $\hat{x}_n$ and x.

FIG. 3 depicts a training process for a blind SR model using the VKAE, according to embodiments of the present disclosure. For a training set comprising multiple HR-LR image pairs wherein in each pair the LR image y is degraded from HR image x using a ground-truth (GT) kernel k, the blind SR model outputs (305), via an iterative restoration-estimation process, a recovered image $\hat{x}_n$ using the Restorer and an estimated kernel feature vector using the Estimator from each LR image. A restoration loss $L_{rst}$ is obtained (310) based on the recovered image $\hat{x}_n$ and the HR image x. In one or more embodiments, the restoration loss $L_{rst}$ is a L1 loss between $\hat{x}_n$ and x. A kernel feature loss $L_{kfeat}$ may be obtained (315) based on the estimated kernel feature vector $\hat{z}_n$ and the kernel feature vector z that is encoded, by the kernel encoder, from the GT kernel k. In one or more embodiments, the kernel feature loss $L_{kfeat}$ is a L1 loss between $\hat{z}_n$ and z. The blind SR model may be trained (320) using at least the restoration loss $L_{rst}$ and the kernel feature loss $L_{kfeat}$.

Given that the blind SR model is used for image SR for blind images without GT kernels, it is desirable and advantageous to train blind SR model with LR images without GT kernels. Such training would increase the robustness of the blind SR model. In one or more embodiments, the training set may comprise multiple blind LR images without GT kernels (or even corresponding HR images). Section C.3 describes details using these blind LR images to introduce a kernel-agnostic loss $L_{kag}$ to train the blind SR model with the VKAE. The training process using the kernel-agnostic loss $L_{kag}$ may be implemented concurrently or separately from the training process using the HR-LR image pairs with GT kernels.

As shown in FIG. 1, multiple losses may be used for the blind SR model training in one or more embodiments. The kernel feature loss ensures accuracy of the kernel Estimator, the kernel-agnostic loss increases the estimation robustness without dependency on GT kernel reference, while the restoration loss helps to maximize restoration fidelity. The pre-trained kernel encoder may help the kernel Estimator learn more representative kernel features by minimizing the kernel feature loss $L_{kfeat}$, which may be a L1 loss between $\hat{z}_n$ and z. Upon training, the blind SR model may be deployed on various platforms for blind image SR operation.

Figure 4:
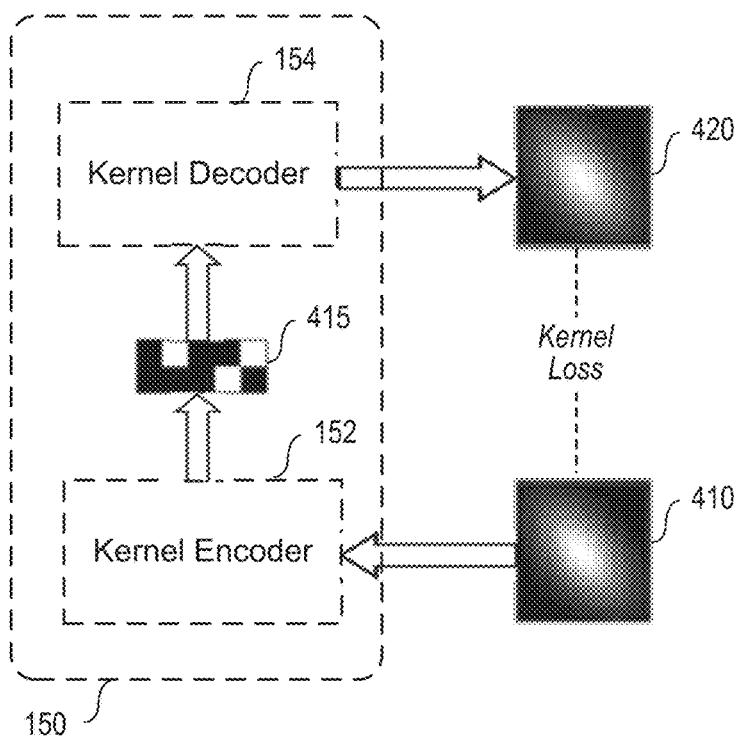
FIG. 4 graphically depicts a pre-training process for the VKAE, according to embodiments of the present disclosure.

FIG. 4 graphically depicts a pre-training process for the VKAE, according to embodiments of the present disclosure. The kernel encoder 152 encodes an input kernel 410 into a kernel feature vector 415, which is then reconstructed, by the kernel decoder 154, into a reconstructed kernel 420. The VKAE is pre-trained using at least a kernel loss $L_{kern}$ (e.g., a L1 loss) between the input kernel 410 and the reconstructed kernel 420. In one or more embodiments, the kernel loss $L_{kern}$ is used together with a Kullback-Leibler (KL) divergence loss for VKAE pre-training. In one or more embodiments, the input kernel 410 is from a synthesized kernel dataset comprising blurring kernels of various dimensions and types (e.g., a bicubic kernel, a Gaussian kernel, average blurring kernel, etc.). Once pre-training is done, parameters of the VKAE are fixed when the VKAE is used to train the blind SR model. Using different kernels for VKAE pre-training may enhance the robustness of the VKAE, and also be beneficial for training process of the blind SR model with the pre-trained VKAE.

As detailed in section C.3, the kernel decoder may be used to introduce a novel kernel-agnostic loss $L_{kag}$ to increase the robustness of kernel Estimator. In one or more embodiments, the added kernel encoder and decoder modules may be used only in the training process to minimize $L_{kfeat}$ and $L_{kag}$, but it may not be used at inference, so the model efficiency is not impacted by the complexity of the kernel encoder and decoder.

2. Embodiments of Variational Kernel Autoencoder

Figure 5:
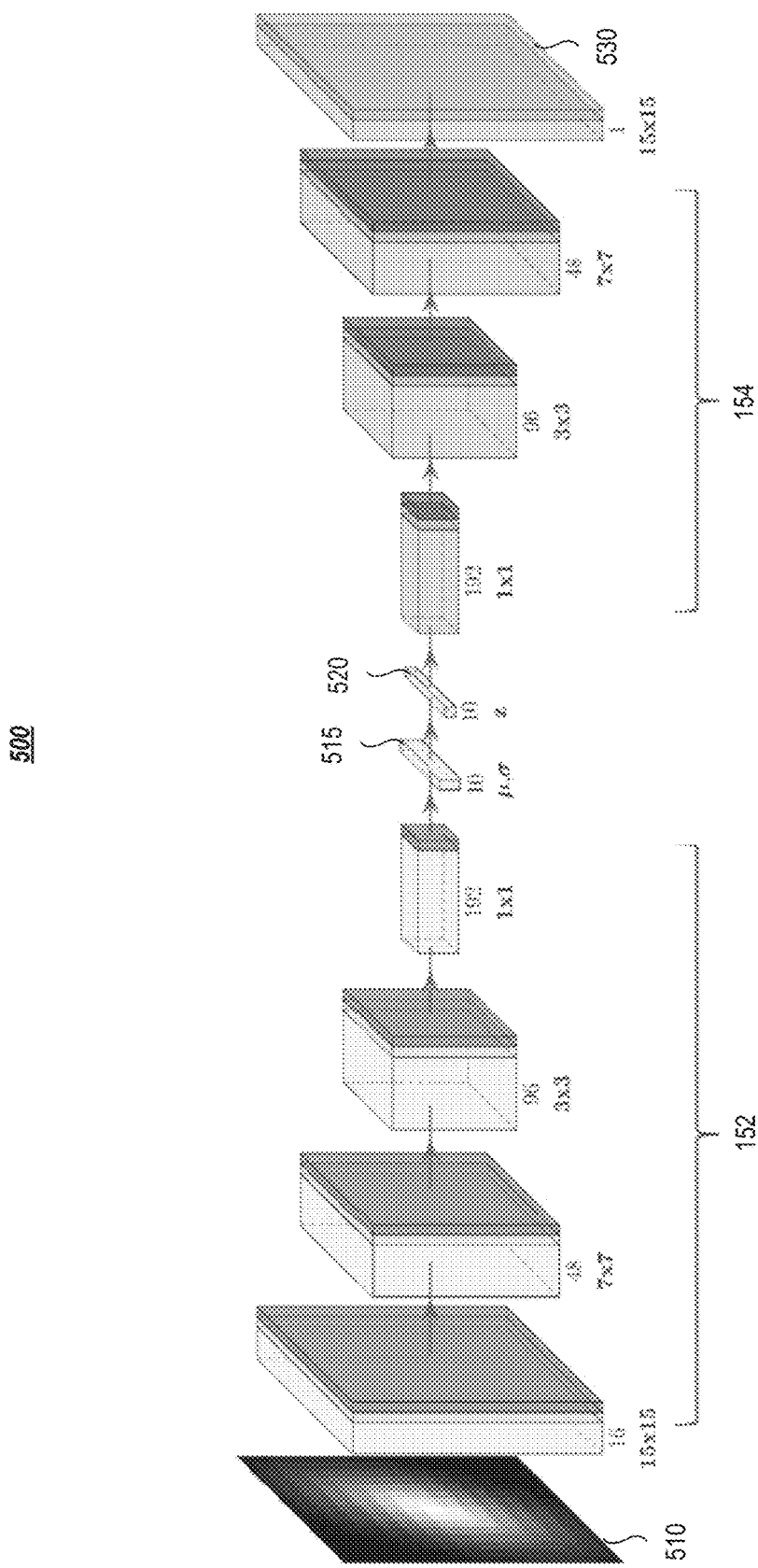
FIG. 5 depicts a network architecture of a VKAE, according to embodiments of the present disclosure.

FIG. 5 depicts a network architecture of a VKAE, according to embodiments of the present disclosure. A VKAE embodiment may comprise one kernel encoder 152 and one kernel decoder 154. The kernel encoder 152 transforms a two-dimensional (2D) kernel 510 into two one-dimensional (1D) vectors 515, which are the mean μ and standard deviation σ of the kernel feature distribution in the latent space respectively. In one or more embodiments, using a reparameterization process introduced in VAE, a 1D feature vector z 520 may be generated from a combination of μ and σ, e.g., μ+σε, where ε is an auxiliary noise variable sampled from standard normal distribution. This reparameterization process may be implemented to enable back-propagation of the random sampling process in VKAE. The decoder outputs a reconstructed kernel 530 from the 1D kernel feature vector z. In one or more embodiments, the reparameterization process may be used in the pre-training of the autoencoder, but in one or more embodiments, e is fixed as zero during training of the main blind SR model. Random sampling of e may be used for generating realistic blur kernels, though this may not be needed in one or more embodiments as the VKAE is mainly used for accurate kernel representation and reconstruction, instead of kernel generation. In the kernel encoder, convolutions with 2× strides may be applied to resize the kernel step-by-step. For the kernel decoder, transposed convolutions may be used to upsample features to restore the kernel in original resolution. Batch normalization and activation may be applied after convolutions except the last layer of strided or transposed convolutions.

In one or more embodiments, leaky rectified linear unit (ReLU) may be used in the encoder while ReLU may be utilized in the decoder with exception of the last layer where a Sigmoid function may be applied. The pre-trained VKAE converts random kernel inputs to a standard normal distribution of features in a latent space. This dense distribution assures a randomly sampled feature point in the latent space corresponds to a realistic kernel as generated by the decoder. Thus the full blind SR model is more robust with higher tolerance of the kernel estimation error.

3. Embodiments of Kernel-Agnostic Loss

Previous blind image SR models, which train kernel estimation and image restoration modules together, have always included a kernel or kernel feature loss that calculates the distance between estimated features and GT kernel references. Such blind image SR models require a fully labeled image set that includes LR-HR pairs and GT kernels. In order to learn more robust kernel features, innovative embodiments of a kernel-agnostic loss (KAL) are disclosed in the present patent document to learn from LR images without using the GT reference kernels. In one or more embodiments, the KAL may be designed by taking advantage of the following kernel-revertible property.

As explained in Section A, convolution with the blur kernel is the first step to model degradation from HR to LR images. Without resampling, this degradation process is simply b=x⊗k. Given a 2D transformation $\mathbb{T}$, it could be proven that the following equation is valid, when $\mathbb{T}$ is either a 90° rotation or a transposition:

$$\mathbb{T}(b) = \mathbb{T}(x) \otimes \mathbb{T}(k) \qquad (6)$$

Subsequently, this theorem is still valid when the transformation is a sequence of one or more such rotations and transpositions. The proofs of these theorems are described in subsection C. 3. a), below. It may be seen from Equation (6) that the SR kernel of $\mathbb{T}(b)$ is $\mathbb{T}(k)$. Therefore, a reversed transformation $\mathbb{T}^{-1}$ to revert $\mathbb{T}(k)$ may be applied to the original kernel k. For example, for a transposition of a kernel, its reversed transformation is also a transposition; while for a 90° rotation, its reversed one is a 90° rotation in the opposite direction. In other words, the blur kernel of a transformed image is revertible when the transformation is limited to the aforementioned variations. Accordingly, a kernel-agnostic loss is designed to improve the robustness of the disclosed kernel estimation method.

In one or more embodiments, the similarity of two kernels may be defined as:

$$sim(k_m, k_n) = 1 - \sum_{i,j=1}^{W} |k_m(i,j) - k_n(i,j)| \qquad (7)$$

where W is the kernel size and (i, j) correspond to different elements of the kernel matrix.

For a pair of LR image y and y' where y'=$\mathbb{T}$(y), a more accurate kernel estimation module may increase the similarity between $\hat{k}$ and $\mathbb{T}^{-1}(\hat{k}')$ based on the kernel-revertible property. Here $\hat{k}$ is the estimated kernel of y, and $\hat{k}'$ is the estimated kernel of y'. However, using the negative value of this similarity as training loss directly could lead the kernel Estimator to a trivial solution of estimating a certain isotropic kernel in regardless of inputs, which makes $\hat{k}$ and $\mathbb{T}^{-1}(\hat{k}')$ identical and results in a loss of zero. In one or more embodiments, to prevent this, a kernel-agnostic loss may be used as follows:

$$L_{kag} = -\log \frac{\exp\left(sim(\hat{k}, \mathbb{T}^{-1}(\hat{k}'))/\tau\right)}{\exp(sim(\hat{k}, \mathbb{T}^{-1}(\hat{k}'))/\tau) + \exp(sim(\hat{k}, \mathbb{T}(\hat{k}))/\tau)} \qquad (8)$$

where the temperature t controls the strength of penalties caused by the similarity between $\hat{k}$ and $\mathbb{T}(k)$.

This kernel-agnostic loss may be considered to resemble the contrastive loss that is used in unsupervised and semi-supervised learning. In the case of contrastive loss, it tries to increase the contrast in similarity between positive pairs or groups as sampled from intra-class samples, and negative ones from inter-class samples. For the kernel-agnostic loss, it forms positive pairs $\hat{k}$ and $\mathbb{T}^{-1}(k')$ as supported by the kernel-revertible property, and negative pairs $\hat{k}$ and $\mathbb{T}(\hat{k})$ caused by kernel asymmetry property from the anisotropic assumption. This loss enables training the full model end-to-end using LR-HR pairs with unknown kernels (hence kernel-agnostic). It makes the kernel Estimator more robust in real-world applications where there is no GT kernel available for the input LR images.

FIG. 6 depicts a process for model training using VKAE with kernel-agnostic loss, according to embodiments of the present disclosure. For a training set comprising multiple LR image pairs wherein in each pair has an original LR image y and a transformed LR image y' that is transformed from the original LR image y via a 2D transformation, the blind SR model outputs (605), via an iterative restoration-estimation process, a first estimated kernel feature vector $\hat{z}_n$ for the original LR image y and a second estimated kernel feature vector $\hat{z}_n'$ for the transformed LR image y' in each LR image pair. The first estimated kernel feature vector $\hat{z}_n$ and the second estimated kernel feature vector $\hat{z}_n'$ are generated independently by the blind SR model to ensure that the blind SR model has no information that the LR image y and the transformed LR image y' are correlated.

The kernel decoder decodes (610) the first estimated kernel feature vector $\hat{z}_n$ and the second estimated kernel feature vector $\hat{z}_n'$ into a first estimated kernel $\hat{k}$ and a second estimated kernel $\hat{k}'$ respectively.

An inversely transformed kernel $\mathbb{T}\mathbb{T}(k')$ is obtained (615) by applying an inverse transformation of the 2D transformation to the second estimated kernel $\hat{k}'$. Afterwards, a similarity between the first estimated kernel $\hat{k}$ and the inversely transformed kernel $\mathbb{T}^{-1}(\hat{k}')$ is obtained (620). In one or more embodiments, the similarity may be defined as shown in Equation (7). In a theoretical situation, the first estimated kernel feature vector k and the transformed kernel feature vector $\mathbb{T}_{-1}(\hat{k}')$ should be identical as indicated by the aforementioned theorem (with proven details in subsection a) below), and thus the similarity shall be 1. However, in real applications, the first estimated kernel feature vector $\hat{k}$ and the inversely transformed kernel feature vector $\mathbb{T}^{-1}(\hat{k}')$ may not be the same, and the difference, as indicated by a similarity not equal to 1, may be used for blind SR model training.

A kernel-agnostic loss $L_{kag}$ is constructed (625) to comprise the similarity. In one or more embodiments, the kernel-agnostic loss $L_{kag}$ further incorporates a second similarity sim($\hat{k}$, $\mathbb{T}(\hat{k})$), which is between the first estimated kernel $\hat{k}$ and a transformed kernel $\mathbb{T}(\hat{k})$ transformed from the first estimated kernel $\hat{k}$ via the 2D transformation. The second similarity is used as a penalty to prevent the blind SR model from figuring out a trivial solution to estimate the same isotropic kernel for both the transformed LR image and the original LR image. In one or more embodiments, the kernel-agnostic loss $L_{kag}$ incorporates a parameter $\tau$ to control the strength of penalties caused by the similarity between $\hat{k}$ and $\mathbb{T}(\hat{k})$.

The blind SR model is trained (630) using at least the kernel-agnostic loss $L_{kag}$. In one or more embodiments, the training process using the kernel-agnostic loss $L_{kag}$ may be implemented together the restoration loss $L_{rst}$ and the kernel feature loss $L_{kfear}$, with the three different losses having the same or different weights in an overall loss during training.

a) Proof of Kernel-Revertible Property

Described in this subsection is detailed proof for theorems of kernel-revertible property. As claimed in Section C.3, if the following is known $$b = \otimes k$$

where b, x, and k are all 2D discrete signals, then the following relationship still holds to be true as $\mathbb{T}$ represents a series of 90° rotation or transposition applied to the 2D discrete signal.

Theorem 1: For a 2D discrete signal x(n) where n=$[n_1, n_2]^T$ are the coordinates of the discrete signal, and its corresponding 2D discrete Fourier transformation $\mathcal{F}$ (x(n))=X($\omega$) where $\omega=[\omega_1, \omega_2]^T$, the following must be true:

$$\mathcal{F}(x(Rn)) = X(R\omega)$$

if $R^T = R^{-1}$. Here R is a 2×2 transformation matrix that is multiplied with 2D coordinates n or $\omega$.

Proof:

From 2D discrete Fourier transform (DFT), the following is known:

$$\mathcal{F}(k(n)) = X(\omega) = \sum_{n_1, n_2} x(n_1, n_2) e^{-j2\pi(\omega_q n_1 + \omega_2 n_2)}$$

This is equivalent to $\mathcal{F}(x(n)) = X(\omega) = \Sigma x(n) e^{-j2\pi\omega^T n}$.

Applying R to n and denoting it as n'=Rn, one may obtain:

$$n = R^{-1} n' = R^T n'$$

Applying Fourier transform to the new signal x(n'), one may get:

$$\mathcal{F}(x(n')) = \Sigma x(n') e^{-j2\pi\omega^T n}$$

Plugging in n=$R^T$n', the following equation may be obtained:

$$\mathcal{F}(x(n')) = \Sigma x(n') e^{-j2\pi\omega^T R^T n'} = \Sigma x(n') e^{-j2\pi(R\omega)^T n'} = X(R\omega)$$

And thus $\mathcal{F}(x(Rn)) = X(R\omega)$.

Theorem 2: As long as $\mathbb{T}$ represents a series of 90° rotation or transposition applied to a 2D discrete signal x(n), $\mathbb{T}(x)$ is equivalent to x(Rn) where the 2D matrix R satisfies $R^T = R^{-1}$ Proof:

In linear algebra, the rotation matrix of any angle $\theta$ is:

$$R = \begin{bmatrix} \cos\theta & -\sin\theta \\ \sin\theta & \cos\theta \end{bmatrix}$$

It is trivial to see $R^T = R^{-1}$ here and a 90° rotation is a special case of either $\theta=90°$ or $\theta=270°$. For transposition, it is simply the switch of coordinate order and the transformation matrix may be written as:

$$R = \begin{bmatrix} 0 & -1 \\ 1 & 0 \end{bmatrix}$$

And again $R^T = R^{-1}$.

It can be shown that if $R = \prod_{i=1}^n R_i$ and $R_i^T = R_i^{-1}$ for any i, then $R^T = R^{-1}$ since $$RR^T = R_1 R_2 \cdots R_n (R_1 R_2 \cdots R_n)^T$$
$$= R_1 R_2 \cdots R_n R_n^T R_{n-1}^T \cdots R_1^T$$
$$= R_1 R_2 \cdots R_{n-1} \cdot I \cdot R_{n-1}^T \cdots R_1^T$$
$$= I$$

Consequently, if $\mathbb{T}$ represents a series of 90° rotation or transposition, $\mathbb{T}(x)$ is equivalent to x(Rn) where $R=\Pi_{i=1}^{n} R_i$ corresponds to the series of transformations. Since each $R_i$ is either 90° rotation or transposition and it is shown above that both satisfy $R_i^T = R_i^{-1}$, one can conclude that the above R satisfies $R^T = R^{-1}$.

Main Proof:

If the Fourier transformation of b, x, and k are denoted as B(ω), X(ω), and K(ω) respectively, then B(ω)=X(ω)K(ω).

Thus for any transformation matrix R, one may have B(Rω)=X(Rω)K(Rω).

Assuming R is the transformation matrix corresponding to $\mathbb{T}$, one may get $\mathcal{F}(b(Rn)) = \mathcal{F}(x(Rn))\mathcal{F}(k(Rn))$ based on Theorem 1 since $R^T=R^{-1}$.

And supported by Theorem 2, the equation $\mathcal{F}(\mathbb{T}(b)) = \mathcal{F}(\mathbb{T}(x))\mathcal{F}(\mathbb{T}(k))$ is obtained.

Thus, the equation (6) $\mathbb{T}(b) = \mathbb{T}(x) \otimes \mathbb{T}(k)$ is proved.

4. Spatially Non-Uniform Kernel Features

Motivated by the fact that the accuracy in kernel estimation may not be spatially uniform, embodiments of a novel attention based adaptive pooling and hybrid kernel feature approach are disclosed in this section. In general, patches with highly focused foreground structures are easier to recover their GT kernels compared to patches with out-of-focus backgrounds or minimum color variations. For example, for a HR patch of uniform color, the degraded LR is the same regardless of the blur kernel which makes the kernel estimation impossible.

This spatially non-uniform property makes the previously widely used global average pooling (GAP) in the kernel Estimator sub-optimal as it does not differentiate areas with variant kernel estimation confidences. To solve this problem, embodiments of an attention-based adaptive pooling are disclosed in the presented blind SR model which assigns different weights to pixels of the patch.

Figure 7:
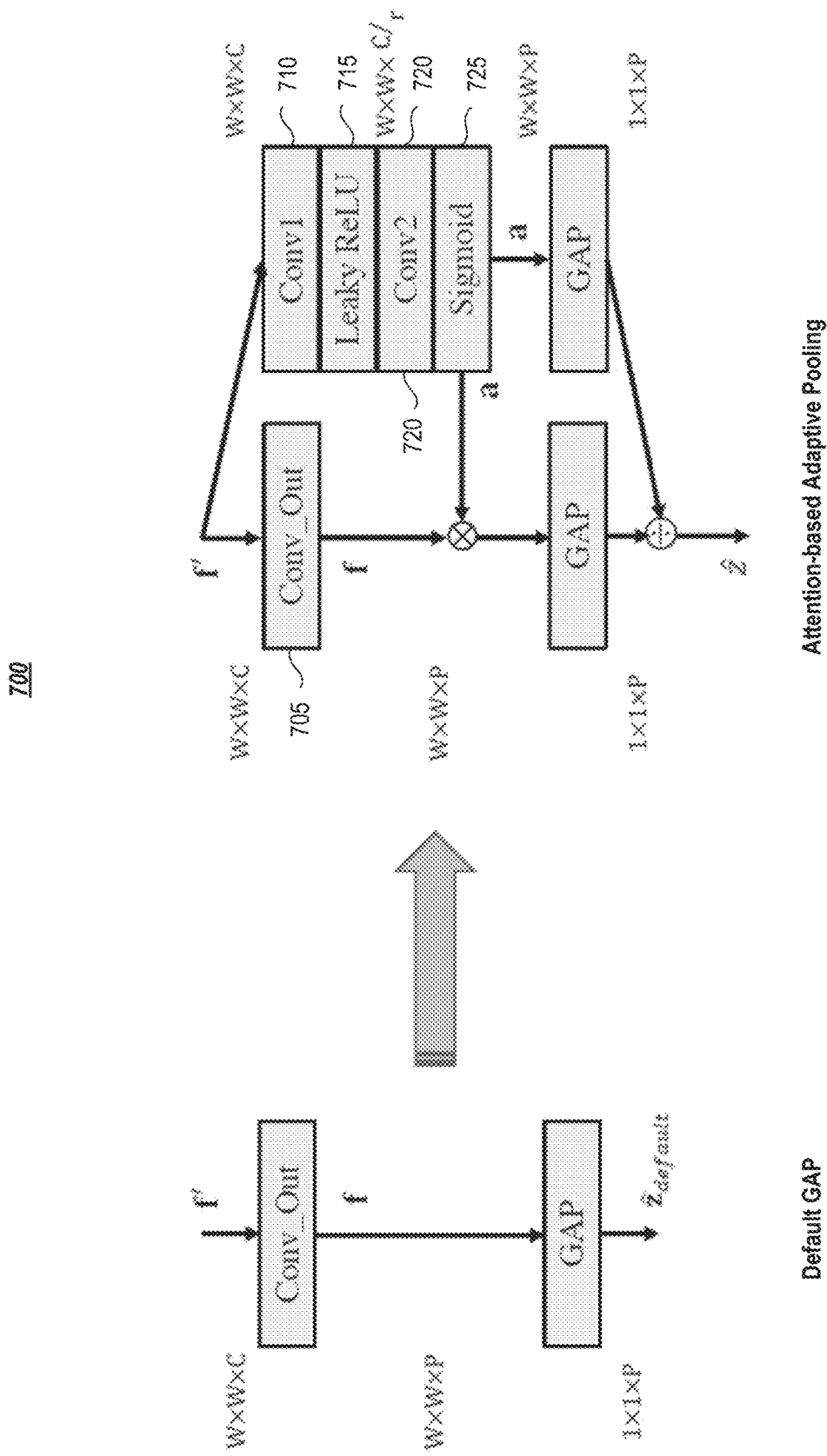
FIG. 7 depicts an attention-based adaptive pooling, according to embodiments of the present disclosure.

FIG. 7 depicts an attention-based adaptive pooling, according to embodiments of the present disclosure. Instead of the widely-used global average pooling (GAP), the adaptive pooling mechanism modifies the last convolution layer and the GAP layer in the kernel Estimator with the default GAP by incorporating an attention branch. In one or more embodiments, the attention branch comprises a first attention convolution layer 710 and a second attention convolution layer 720 which are connected via a leaky ReLU activation 715 and followed by a Sigmoid activation 725 at the end. Here W is the patch size for training, C is the number of feature channels in the kernel Estimator, P is the dimensionality of kernel features in the latent space and r is a reduction constant for the first convolution layer 710 in the attention branch. W=64, P=10, C=64 and r=4 are used in experiments of the present model respectively.

A default GAP process may be denoted as:

$$\hat{z}_{default} = \frac{1}{W^2} \sum_{i,j=1}^{W} f(i,j) \quad (9)$$

In one or more embodiments, the attention process may be defined as a=𝔸(f'), where f' is the feature input to the final convolution layer 705 in the kernel Estimator, and the kernel feature $\hat{z}_\alpha$ with attention based adaptive pooling may be defined as:

$$\hat{z} = \frac{\sum_{i,j=1}^{W} f(i,j) \cdot a(i,j)}{\sum_{i,j=1}^{W} a(i,j)} \quad (10)$$

The GAP may be viewed as a special case of this adaptive pooling where the attention for each pixel is the same (i.e., 1). For general cases, pixels with higher confidence in kernel estimation tend to have higher attention, as evidenced by visual examples in FIG. 11.

In one or more embodiments, instead of the spatially-invariant global feature $\hat{z}$, a hybrid kernel feature $\hat{z}_h = \alpha \hat{z} + (1-\alpha)f$ may be used to concatenate with LR features in the SR Restorer. It is a simple linear mixture between $\hat{z}$ and spatially-variant local feature f, where α is a learnable parameter which may vary at different layers. This hybrid feature adds minimum number of model parameters and does not change model complexity of the Restorer, while enabling the Restorer to learn from local kernel features for additional tolerance of kernel estimation uncertainty. In one or more embodiments, the spatially-invariant global feature $\hat{z}$ may be the kernel feature $\hat{z}_\alpha$ with attention-based adaptive pooling, such that both attention-based adaptive pooling and hybrid kernel feature may be applied together in blind SR training and operation.

Figure 8:
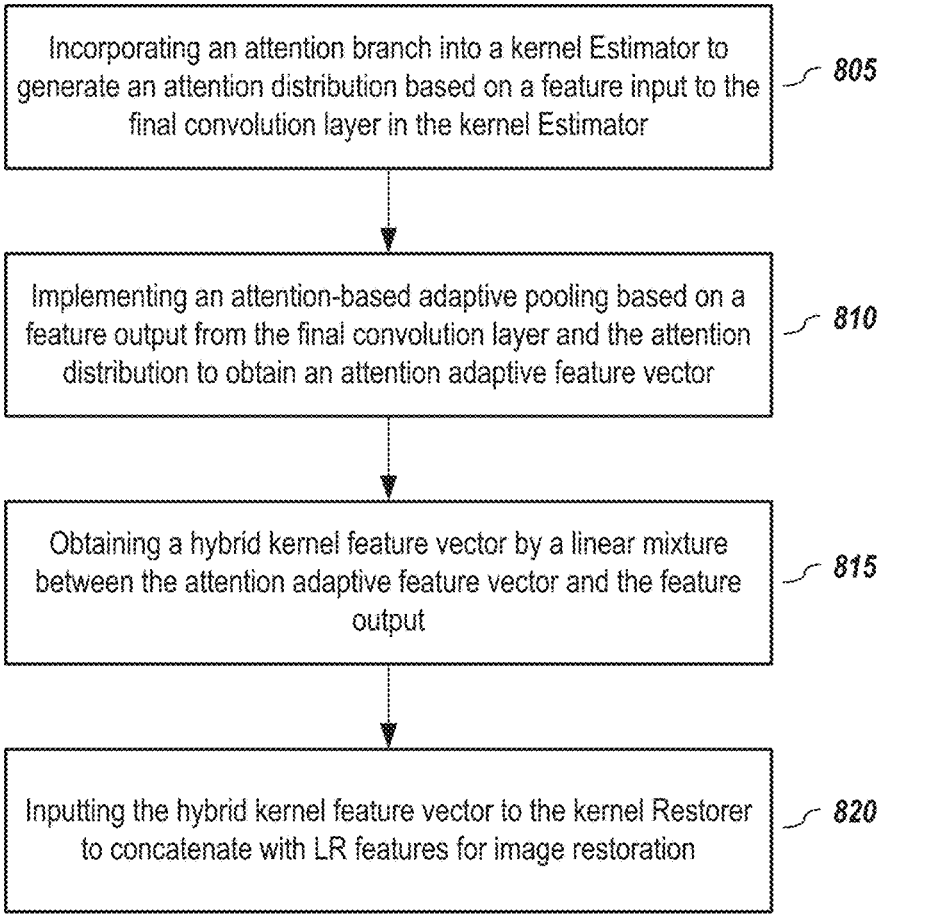
FIG. 8 depicts a process for the adaptive pooling, according to embodiments of the present disclosure.

FIG. 8 depicts a process for adaptive pooling, according to embodiments of the present disclosure. An attention branch is incorporated (805) into a kernel Estimator to generate an attention distribution a based on a feature input f' to the final convolution layer in the kernel Estimator. In one or more embodiments, the attention branch comprises a first attention convolution layer and a second attention convolution layer that are connected via a leaky ReLU activation and followed by a Sigmoid activation. An attention-based adaptive pooling is implemented (810) based on a feature output f from the final convolution layer and the attention distribution to obtain an attention adaptive feature vector $\hat{z}_a$. A hybrid kernel feature vector $\hat{z}_h$ is obtained (815) by a linear mixture between the attention adaptive feature vector $\hat{z}_a$ and the feature output f. The hybrid kernel feature vector $\vec{z}_h$ is input to the kernel Restorer to concatenate (820) with LR features for image restoration.

D. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Experimental Settings

A total of 3450 HR images from various data sets are used to synthesize degraded LR images with random kernels for training. The degradation setting is similar to the one used in KernelGAN. It generates more general and irregular blur kernels which are modeled as anisotropic Gaussian kernels with multiplicative noise. During training, the kernel width λ is uniformly sampled from [0.6, 5.0] and the multiplicative noise is uniform sampled from [0.75, 1.25]. The kernel size is set as 15×15 to fit the kernel autoencoder design. Same as KernelGAN, the kernels used for ×2 are also applied to ×4 models, where the kernel convolution and ×2 resampling are applied twice to resize the HR image to LR.

Figure 9A:
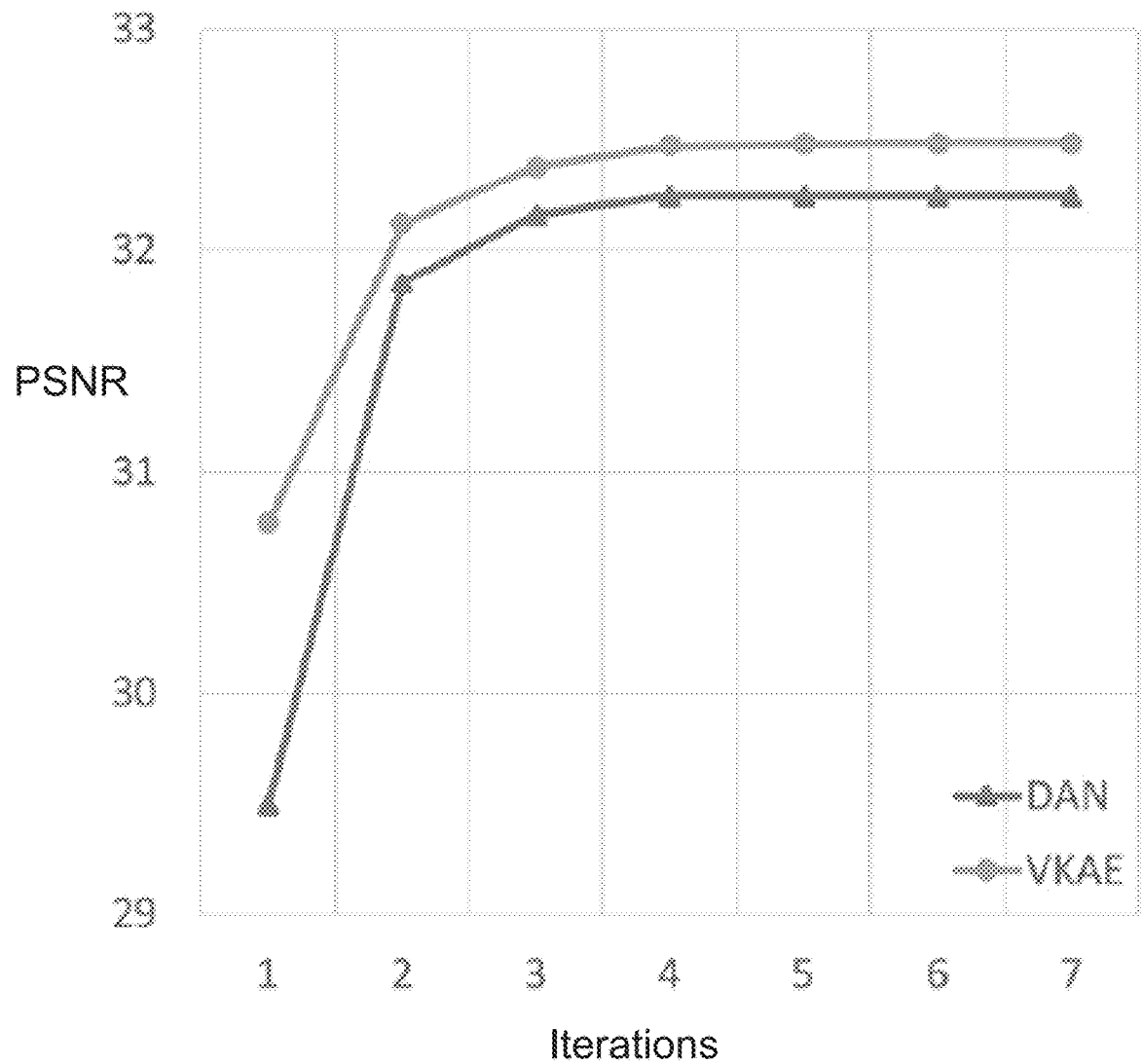
FIG. 9A depicts average PSNR values of different iterations at inference, according to embodiments of the present disclosure.
Figure 9B:
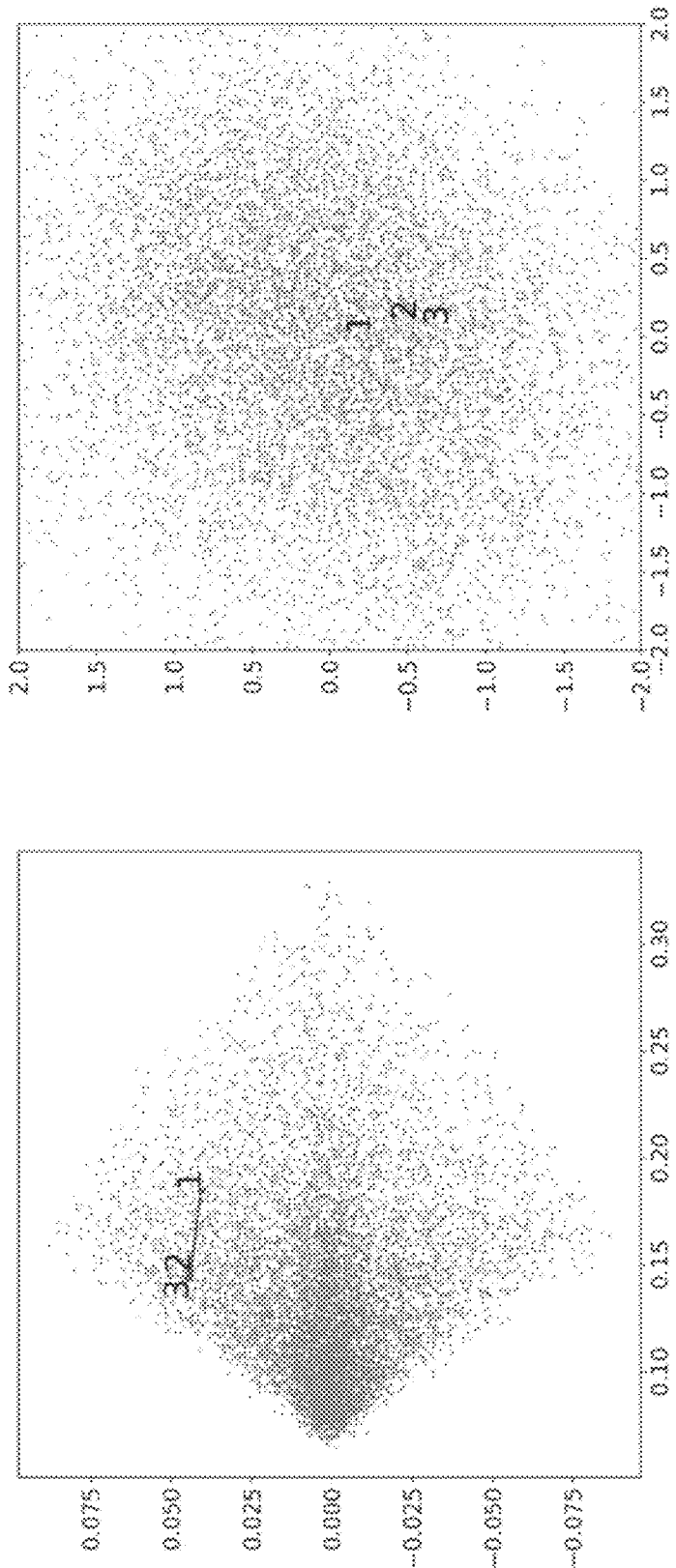
FIG. 9B depicts a comparison between VKAE and PCA-based kernel feature latent space, according to embodiments of the present disclosure.

For quantitative evaluation, HR images from various datasets are used. The LR images are synthesized from HR images following the same degradation settings used for training. Due to the large variations in random degradation, three sets of LR images are generated for each test set and the results described in the following experiments are the average of all three sets. An image set comprising LR images with unknown kernels is also included for direct comparison with other models which have been tested using the same image set. As some existing blind SR models were trained using different degradation settings, two SOTA models, deep alternating network (DAN) and degradation-aware super-resolution (DASR), are also retrained using presenting degradation settings for fair comparison as included in Table 1. They are denoted as DAN* and DASR* respectively.

number of iterations in the range of 1 to 7. First the highest PSNR for VKAE method is 32.48 dB compared to 32.24 dB of DAN, showing better restoration fidelity. Furthermore, while both methods approach their respective best results after 4 iterations, the VKAE converges faster. In this case, the proposed VKAE method reaches comparable accuracy using half of the iterations (2 versus 4) comparing to DAN, making it a more efficient method. FIG. 9B depicts the distributions of kernel features in latent space latent space feature distribution overlaid with example of kernel estimation convergence trajectory for comparison between PCA and VKAE methods. For the PCA features in DAN, its dense population sits at the left corner of the overall distribution while for VKAE, the feature points form a standard normal distribution as designed. The feature trajectory of one inference instance is also overlaid on top of the scattered feature points to illustrate the convergence of kernel estimation at

TABLE 1

Quantitative comparison of SOTA SR methods with the best two results are highlighted in bold and underline respectively.

| Method | Scale | Dataset 1 | Dataset 2 | Dataset 3 | Dataset 4 | Dataset 5 | Dataset 6 |
|---|---|---|---|---|---|---|---|
| Bicubic | ×2 | 29.82/0.8620 | 26.48/0.7475 | 26.65/0.7118 | 23.86/0.7051 | 28.92/0.8092 | 28.85/0.8095 |
| Bicubic + ZSSR | ×2 | 30.31/0.8765 | 26.52/0.7557 | 26.95/0.7279 | 24.22/0.7233 | 29.24/0.8209 | 29.08/0.8205 |
| RCAN | ×2 | 30.30/0.8763 | 27.13/0.7655 | 26.98/0.7280 | 24.37/0.7275 | 29.36/0.8225 | 29.21/0.8222 |
| IKC | ×2 | 34.06/0.9294 | 29.46/0.8445 | 28.57/0.7986 | 26.18/0.8044 | 31.55/0.8792 | 31.44/0.8793 |
| DAN | ×2 | 35.16/0.9400 | 30.55/0.8606 | 29.40/0.8168 | 27.22/0.8276 | 32.77/0.8981 | 32.58/0.9010 |
| DASR | ×2 | 32.60/0.9117 | 28.32/0.8069 | 27.88/0.7660 | 25.44/0.7686 | 30.84/0.8590 | 30.75/0.8611 |
| KOALANet | ×4 | –/– | –/– | –/– | –/– | –/– | 31.89/0.8852 |
| KernelGAN + ZSSR | ×2 | 31.31/0.9011 | 28.19/0.8216 | 27.88/0.7884 | 25.56/0.7906 | 30.40/0.8613 | 30.36/0.8669 |
| FKP + USRNet | ×2 | 30.95/0.9239 | 27.18/0.8256 | 26.99/0.7853 | 25.17/0.7934 | 28.25/0.8428 | 28.18/0.8510 |
| DAN* | ×2 | <u>36.90/0.9504</u> | <u>32.24/0.8894</u> | <u>30.97/0.8661</u> | <u>29.71/0.8917</u> | <u>34.35/0.9236</u> | <u>34.28/0.9252</u> |
| DASR* | ×2 | 36.28/0.9469 | 31.66/0.8799 | 30.56/0.8592 | 28.81/0.8753 | 33.75/0.9169 | 33.40/0.9159 |
| VKAE | ×2 | 36.96/0.9518 | 32.59/0.8956 | 31.26/0.8739 | 30.40/0.9038 | 34.73/0.9288 | 34.31/0.9258 |
| Bicubic | ×4 | 24.40/0.6739 | 23.02/0.5774 | 23.93/0.5654 | 20.95/0.5336 | 25.41/0.6793 | 25.49/0.6813 |
| Bicubic + ZSSR | ×4 | 24.52/0.6831 | 23.03/0.5851 | 24.05/0.5737 | 21.08/0.5444 | 25.54/0.6868 | 25.60/0.6886 |
| RCAN | ×4 | 24.52/0.6851 | 23.43/0.5877 | 24.05/0.5724 | 21.14/0.5465 | 25.58/0.6881 | 25.66/0.6903 |
| IKC | ×4 | 27.69/0.7983 | 25.94/0.6916 | 25.66/0.6539 | 22.92/0.6547 | 27.70/0.7651 | 27.70/0.7668 |
| DAN | ×4 | 27.21/0.7821 | 25.51/0.6728 | 25.51/0.6435 | 22.76/0.6393 | 27.52/0.7544 | 27.54/0.7559 |
| DASR | ×4 | 28.21/0.8087 | 25.84/0.6774 | 25.94/0.6577 | 23.17/0.6562 | 28.11/0.7678 | 28.15/0.7705 |
| KOALANet | ×4 | –/– | –/– | –/– | –/– | –/– | 27.77/0.7637 |
| KernelGAN + ZSSR | ×4 | –/– | –/– | –/– | 21.80/0.5853 | 26.69/0.7275 | 26.81/0.7316 |
| FKP + USRNet | ×4 | 24.69/0.7240 | 23.40/0.6130 | 23.71/0.5892 | 21.24/0.5756 | 23.40/0.6399 | 23.34/0.6417 |
| DAN* | ×4 | <u>30.05/0.8482</u> | <u>27.27/0.7268</u> | <u>26.79/0.6921</u> | <u>24.77/0.7276</u> | <u>29.30/0.8009</u> | <u>29.29/0.8024</u> |
| DASR* | ×4 | 29.56/0.8415 | 26.92/0.7163 | 26.59/0.6856 | 24.00/0.6973 | 28.59/0.7813 | 28.54/0.7816 |
| VKAE | ×4 | 30.42/0.8555 | 27.60/0.7363 | 26.94/0.6998 | 25.00/0.7381 | 29.50/0.8068 | 29.30/0.8026 |

The LR patches used for training are 64×64 in dimension for all scaling factors. Each model is trained for 125 epochs, where each epoch includes 5000 iterations. Using Adam optimizer, the model is trained with an initial learning rate of $1 \times 10^{-4}$ which decays by half after every 25 epochs. All training is conducted on 2 to 4 NVIDIA V100 GPU cards. For training of the kernel autoencoder, the same degradation settings are used to synthesize random kernels. The autoencoder is trained 400 epochs, each has 10 iterations of a batch of 8000 random kernels. The Adam optimizer starts from a learning rate of $1 \times 10^{-3}$ using cosine annealing schedule.

2. Variational Kernel Autoencoder

To demonstrate the effectiveness of the proposed variational kernel autoencoder, an experiment is conducted to assess its performance with varying number of iterations at inference. It is compared with DAN using the average of three Set14 test sets. For fair comparison, the DAN model is re-trained using the same data degradation settings as the presented VKAE, and the same Estimator and Restorer as DAN are used while PCA is replaced with the presented VKAE. As shown in the left chart of FIG. 9A, the average PSNRs of Set14 of both methods are included for different inference. Only the first 3 iterations are included in the trajectory as the later ones are too close to each other. Corresponding visual results at different iterations are included in subsection D.7.

3. Synthesized Images

As shown in Table 1, experiments were conducted on ×2 and ×4 scaling factors following dataset 6. For each scaling factor, the compared models are categorized as four groups. The first group comprises models and methods, including Bicubic, Bicubic+ZSSR, and residual channel attention networks (RCAN), assuming standard bicubic interpolation in degradation. The results of these models are worse in general as expected. The second group includes SOTA models like Iterative Kernel Correction (IKC), DAN, DASR, and a blind SR framework based on kernel-oriented adaptive local adjustment (KOALANet) whose trained-model are available. These models are trained with degradation settings (Gaussian blur before additional bicubic interpolation) different from dataset 6 and embodiments of the presented model. Additionally, only isotropic Gaussian kernels were used for training in IKC, and DASR in scaling factor of ×2. Even with discrepancies in degradation settings, these models outperform methods in the first group which are only optimized for bicubic interpolation.

The third group includes two-step methods, KernelGAN+ZSSR and FKP+USRNet, which apply a blur kernel estimation model and a non-blind SR model separately. These methods use similar degradation settings as the presented model so the direct comparison is reasonable. However, these two-step methods fall behind those in the previous group significantly in terms of accuracy. This again shows the non-blind SR model is very sensitive to errors introduced in the kernel estimation model. In the case of FKP+USRNet process, its performance suffers greatly compared to the test results in FKP for similar test datasets. The main cause is the increased kernel variation in the test sets where random multiplicative noise is applied on top of anisotropic Gaussian blur.

For fair comparison, two of the best models in the second group, DAN and DASR, are trained using the same degradation settings as the presented model, denoted as DAN* and DASR* respectively. As shown in Table 1, with great improvements in kernel feature representation in latent space, the VKAE model embodiment achieves the best in all test sets in both ×2 and ×4 scaling factors. For dataset 6 that has been assessed in various studies, the VKAE model is able to raise the SOTA results in PSNR from 32.56 dB and 28.15 dB to 34.31 dB and 29.30 dB for ×2 and ×4 scaling factors respectively. Embodiments of the VKAE model show obvious improvements in restoring sharp edges and high frequency details even comparing to the next best DAN* model.

4. Ablation Study

To demonstrate the effectiveness of the proposed variational kernel autoencoder (VKAE), an ablation study was conducted to compare a baseline model using standard autoencoder (AE) with accumulatively added innovative modules, including VKAE, hybrid kernel feature $\alpha\hat{z}+(1-\alpha)f$, attention-based adaptive pooling and kernel-agnostic loss $L_{kag}$. Three datasets with ×2 scaling factor are used for assessment. As shown in Table 2, these innovated modules are able to improve accuracy step by step consistently for all three datasets. There is one exception of Dataset 4 as highlighted in bold font, where the restoration accuracy in both PSNR and SSIM drops when the non-uniform kernel feature is introduced. This may be caused by the bias in Dataset 4 which includes structures with ubiquitous line patterns.

which are caused by kernel estimation error. For DASR and DAN* that are trained in end-to-end fashion, both show good performance on real images with unknown kernels. However, there are noticeable blurs around small line features in both cases. In comparison, the presented model delivers the sharpest result overall, demonstrating strong real-world image applicability.

6. Attention based Adaptive Pooling

Figure 11:
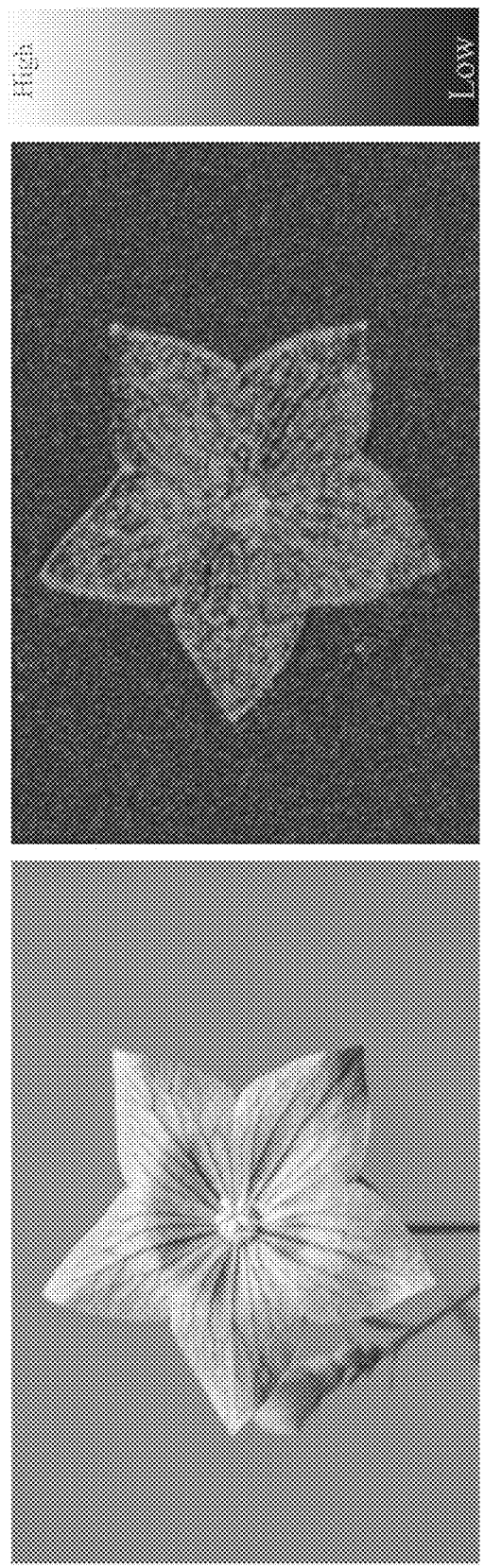
FIG. 11 depicts an example of spatially non-uniform attention map in kernel Estimator, according to embodiments of the present disclosure.

To have a better understanding of the disclosed attention-based adaptive pooling in Section C.4, an example of the related attention map is visualized in FIG. 11. It is clearly seen that the foreground objects, such as the flower, especially the flower in this image receive more attention in the proposed adaptive pooling compared to regions in the background. This leads to the kernel estimation relies more on the foreground pixels which is expected intuitively. Such an advantage of the new adaptive pooling is also demonstrated in the average kernel feature loss, which leads to a 1.4% reduction at the completion of training compared to GAP.

7. Visual Comparison of Iterations

Visual examples of experiments in Section D.2 show the effects of more accurate kernel estimation with increasing number of iterations, which result in better restoration quality step by step. It also demonstrates the advantage of the presented blind SR model comparing to PCA, generating high fidelity restoration with less iteration needed. Visual comparison among recovered images using different models also verifies that embodiments of the presented model may have more power to restore a more accurate and sharper image in general.

E. Some Observations

Blind image SR tends to be a challenging problem due to the difficulty in finding an effective kernel representation that is optimal for the full restoration process. To attack this challenge, novel blind SR method embodiments based on VAE with kernel agnostic loss are disclosed in the present patent document. The non-linearity feature representation ability of VAE leads to more effective estimation of the kernel, and its dense feature distribution in latent space results in a more efficient kernel estimation in the iterative process. While attention-based adaptive pooling leads to a more accurate kernel feature estimation, both the kernel agnostic loss and hybrid kernel feature make the model more robust to uncertainties in kernel feature estimation. Comprehensive experiments on both synthetic and real image

TABLE 2

Ablation study for scaling factor of ×2.

| Dataset | AE baseline | VKAE | +hybrid kernel Feature | +Adaptive Pooling | +Kernel-Agnostic Loss |
|---|---|---|---|---|---|
| Dataset 3 | 31.14/0.8716 | 31.15/0.8706 | 31.16/0.8709 | 31.17/0.8710 | 31.26/0.8739 |
| Dataset 4 | 30.05/0.8984 | 30.22/0.8996 | 30.18/0.8994 | 30.31/0.9011 | 30.40/0.9038 |
| Dataset 5 | 34.54/0.9268 | 34.57/0.9266 | 34.60/0.9268 | 34.65/0.9272 | 34.73/0.9288 |

5. Real Image Results

Figure 10:
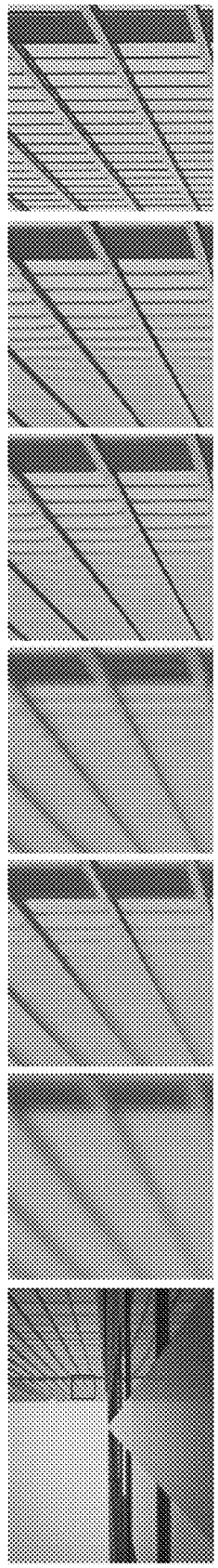
FIG. 10 depicts visual comparison of qualitative results for blind image super-resolution among different models, according to embodiments of the present disclosure.

Embodiments of the present VKAE method are also compared with others on old historic images which have no ground-truth references. Qualitative results of one ×4 example are shown in FIG. 10. In addition to the presented model embodiments, one representative model from each of the four groups in Table 1 is included for visual comparison. For KernelGAN, the real image option is activated for ZSSR in the restoration step. The result is sharper compared to bicubic resizing, but there are obvious artifacts present data sets validate a remarkably better performance of embodiments of the disclosed model over the current SOTA methods.

F. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 12:
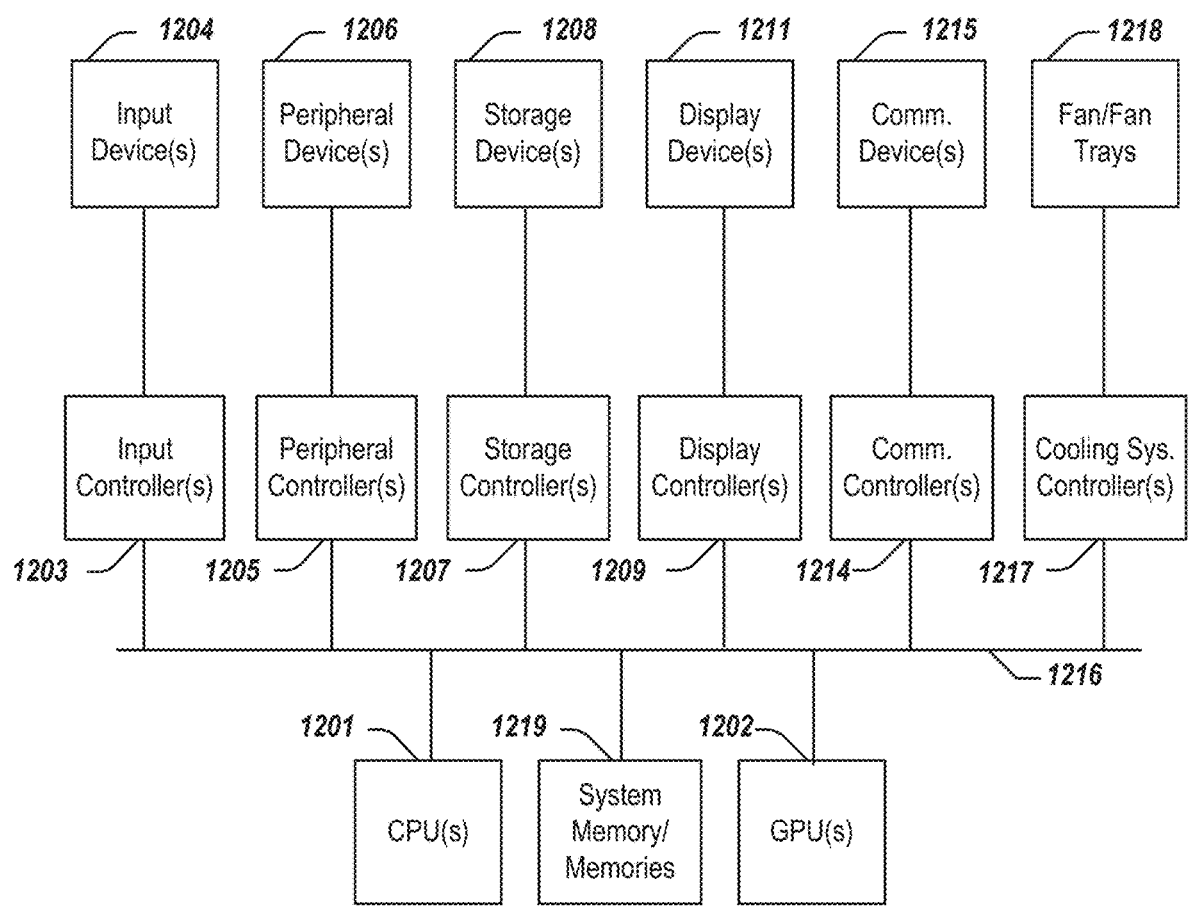
FIG. 12 depicts a simplified block diagram of a computing device/information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more CPUs 1201 that provides computing resources and controls the computer. CPU 1201 may be implemented with a microprocessor or the like, and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for blind super-resolution (SR), the method comprising:
   in a first iteration of an iterative restoration-estimation process:
      receiving, at a super-resolution (SR) restorer in a blind SR model, an input image and an initial kernel feature vector to generate an intermediate recovered image; and
      generating, using a kernel estimator in the blind SR model, an updated kernel feature vector based on the intermediate recovered image and a low-resolution (LR) image, wherein the blind SR model is trained, before deployment, using a variational kernel auto-encoder (VKAE) with a training set comprising multiple image pairs, each image pair has a high-resolution (HR) image and a low-resolution (LR) image degraded from the HR image using a ground-truth (GT) kernel;
   continuing the restoration-estimation process for a plurality of iterations until a stop condition is met; and
   outputting a recovered image with a resolution higher than the input image by the SR restorer and a kernel feature vector by the kernel estimator.

2. The computer-implemented method of claim 1, wherein the VKAE comprises a kernel encoder and a kernel decoder, the blind SR model is pre-trained by steps comprising:
   outputting a recovered image using the SR restorer and an estimated kernel feature vector using the kernel estimator based on the LR image in each image pair;
   obtaining a restoration loss based on the recovered image and the HR image in each image pair;
   obtaining a kernel feature loss based on the estimated kernel feature vector and the kernel feature vector that is encoded, by the kernel encoder, from the GT kernel; and
   training the blind SR model using at least the restoration loss and the kernel feature loss.

3. The computer-implemented method of claim 2, wherein the restoration loss is an L1 loss between the recovered image and the HR image in each image pair, the kernel feature loss is an L1 loss between the estimated kernel feature vector and the kernel feature vector.

4. The computer-implemented method of claim 2, wherein the training set further comprises multiple LR image pairs with each LR image pair having an original LR image and a transformed LR image transformed from the original LR image via a 2D transformation.

5. The computer-implemented method of claim 4, wherein the blind SR model is further pre-trained by steps comprising:
   outputting, using the blind SR model, a first estimated kernel feature vector for the original LR image and a second estimated kernel feature vector for the transformed LR image in each LR image pair;
   decoding, using the kernel decoder, the first estimated kernel feature vector and the second estimated kernel feature vector into a first estimated kernel and a second estimated kernel respectively;
   obtaining an inversely transformed kernel by applying an inverse transformation of the 2D transformation to the second estimated kernel;
   obtaining a similarity between the first estimated kernel and the inversely transformed kernel;
   constructing a kernel-agnostic loss that comprises the similarity; and
   training the blind SR model using at least the kernel-agnostic loss.

6. The computer-implemented method of claim 5, wherein the kernel-agnostic loss is used together with the restoration loss and the kernel feature loss for training the blind SR model with the three different losses having same or different weights during training.

7. The computer-implemented method of claim 5, wherein the kernel-agnostic loss further comprises a second similarity, which is between the first estimated kernel and a transformed kernel that is transformed from the first estimated kernel via the 2D transformation, the second similarity is used in the kernel-agnostic loss for penalties caused by estimated kernel symmetry.

8. The computer-implemented method of claim 1, wherein the initial kernel feature vector is a kernel feature vector corresponding to a common kernel or an average of kernel features in a latent space.

9. A computer-implemented method for blind super-resolution (SR) training, the method comprising:
   given a training set comprising multiple image pairs with each image pair having an original image and a transformed image transformed from the original image via a 2D transformation, outputting, using a blind SR model comprising a SR restorer and a kernel estimator linked iteratively, a first estimated kernel feature vector for the original image and a second estimated kernel feature vector for the transformed image in each image pair;
   decoding, using a kernel decoder in a variational kernel autoencoder (VKAE), the first estimated kernel feature vector and the second estimated kernel feature vector into a first estimated kernel and a second estimated kernel respectively, wherein the VKAE comprises the kernel decoder and a kernel encoder that encodes a kernel into a kernel feature vector;

obtaining an inversely transformed kernel by applying an inverse transformation of the 2D transformation to the second estimated kernel;

obtaining a similarity between the first estimated kernel and the inversely transformed kernel;

constructing a kernel-agnostic loss that comprises the similarity; and training the blind SR model using at least the kernel-agnostic loss.

10. The computer-implemented method of claim 9, wherein the kernel-agnostic loss further comprises a second similarity, which is between the first estimated kernel and a transformed kernel that is transformed from the first estimated kernel via the 2D transformation, wherein the second similarity is used in the kernel-agnostic loss for penalties caused by the second similarity.

11. The computer-implemented method of claim 9, wherein the training set further comprises multiple training image pairs, each training image pair has a high-resolution (HR) image and a low-resolution (LR) image degraded from the HR image using a ground-truth (GT) kernel, the blind SR model is further trained by steps comprising:

outputting a recovered image by the SR restorer and an estimated kernel feature vector by the kernel estimator based on the LR image in each training image pair;

obtaining a restoration loss based on the recovered image and the HR image in each image pair;

obtaining a kernel feature loss based on the estimated kernel feature vector and the kernel feature vector that is encoded, by the kernel encoder, from the GT kernel; and training the blind SR model using at least the restoration loss and the kernel feature loss.

12. The computer-implemented method of claim 11, wherein the kernel-agnostic loss is used together with the restoration loss and the kernel feature loss for training the blind SR model with the three different losses having same or different weights during training.

13. The computer-implemented method of claim 9, wherein the 2D transformation is a 90° rotation or a transposition, or a combination of multiple 90° rotations and/or transpositions.

14. The computer-implemented method of claim 9, wherein before the VKAE is used to train the blind SR model, the VKAE is pre-trained using steps comprises:

encoding, using the kernel encoder, an input kernel into a kernel feature vector, wherein the input kernel is from a synthesized kernel dataset comprising blurring kernels of various dimensions and types;

reconstructing, by the kernel decoder, into a reconstructed kernel; and training the VKAE using at least a kernel loss between the input kernel and the reconstructed kernel.

15. A non-transitory computer-readable medium or media comprising one or more sequences of instructions which, when executed by at least one processor, causes steps for blind super-resolution comprising:

pre-training a variational kernel autoencoder (VKAE) using a kernel dataset comprising various blurring kernels, wherein the VKAE comprises a kernel encoder to encode a blurring kernel from the kernel dataset into a kernel feature vector and a kernel decoder to reconstruct the kernel feature vector into a reconstructed burring kernel, a kernel loss between the burring kernel and the reconstructed burring kernel is used for pre-training; and training, with the pre-trained VKAE, a blind SR model using a training set comprising multiple image pairs, wherein each image pair has a high-resolution (HR) image and a low-resolution (LR) image degraded from the HR image using a ground-truth (GT) kernel, the blind SR model comprises a SR restorer and a kernel estimator linked iteratively, the blind SR model is trained using steps comprising:

outputting a recovered image by the SR restorer and an estimated kernel feature vector by the kernel estimator based on the LR image in each image pair;

obtaining a restoration loss based on the recovered image and the HR image in each image pair;

obtaining a kernel feature loss based on the estimated kernel feature vector and the kernel feature vector that is encoded, by the kernel encoder, from the GT kernel; and training the blind SR model using at least the restoration loss and the kernel feature loss.

16. The non-transitory computer-readable medium or media of claim 15, wherein the training set further comprises multiple LR image pairs with each LR image pair having an original LR image and a transformed LR image transformed from the original LR image via a 2D transformation.

17. The non-transitory computer-readable medium or media of claim 16, wherein the blind SR model is trained using steps further comprising:

outputting, using the blind SR model, a first estimated kernel feature vector for the original LR image and a second estimated kernel feature vector for the transformed LR image in each LR image pair;

decoding, using the kernel decoder, the first estimated kernel feature vector and the second estimated kernel feature vector into a first estimated kernel and a second estimated kernel respectively;

obtaining an inversely transformed kernel by applying an inverse transformation of the 2D transformation to the second estimated kernel;

obtaining a similarity between the first estimated kernel and the inversely transformed kernel;

constructing a kernel-agnostic loss that comprises the similarity; and training the blind SR model using at least the kernel-agnostic loss.

18. The non-transitory computer-readable medium or media of claim 15, wherein the estimated kernel feature vector output by the kernel estimator is a hybrid kernel feature vector that mixes a spatially-invariant global kernel feature and a spatially-variant local kernel feature.

19. The non-transitory computer-readable medium or media of claim 18, wherein the hybrid kernel feature vector is concatenated with LR features in the SR restorer for image restoration.

20. The non-transitory computer-readable medium or media of claim 18, wherein the spatially-invariant global kernel feature is an attention adaptive feature vector generated using steps comprising:

generating, using an attention branch incorporated into the kernel estimator, an attention distribution based on a feature input to a final convolution layer in the kernel estimator, wherein the attention branch comprises a first attention convolution layer and a second attention convolution layer that are connected via a leaky rectified linear unit (ReLU) activation and followed by a sigmoid activation; and implementing an attention based adaptive pooling based on a feature output from the final convolution layer and the attention distribution to obtain the attention adaptive feature vector.

\* \* \* \* \*